UNITED STATES PATENT OFFICE.

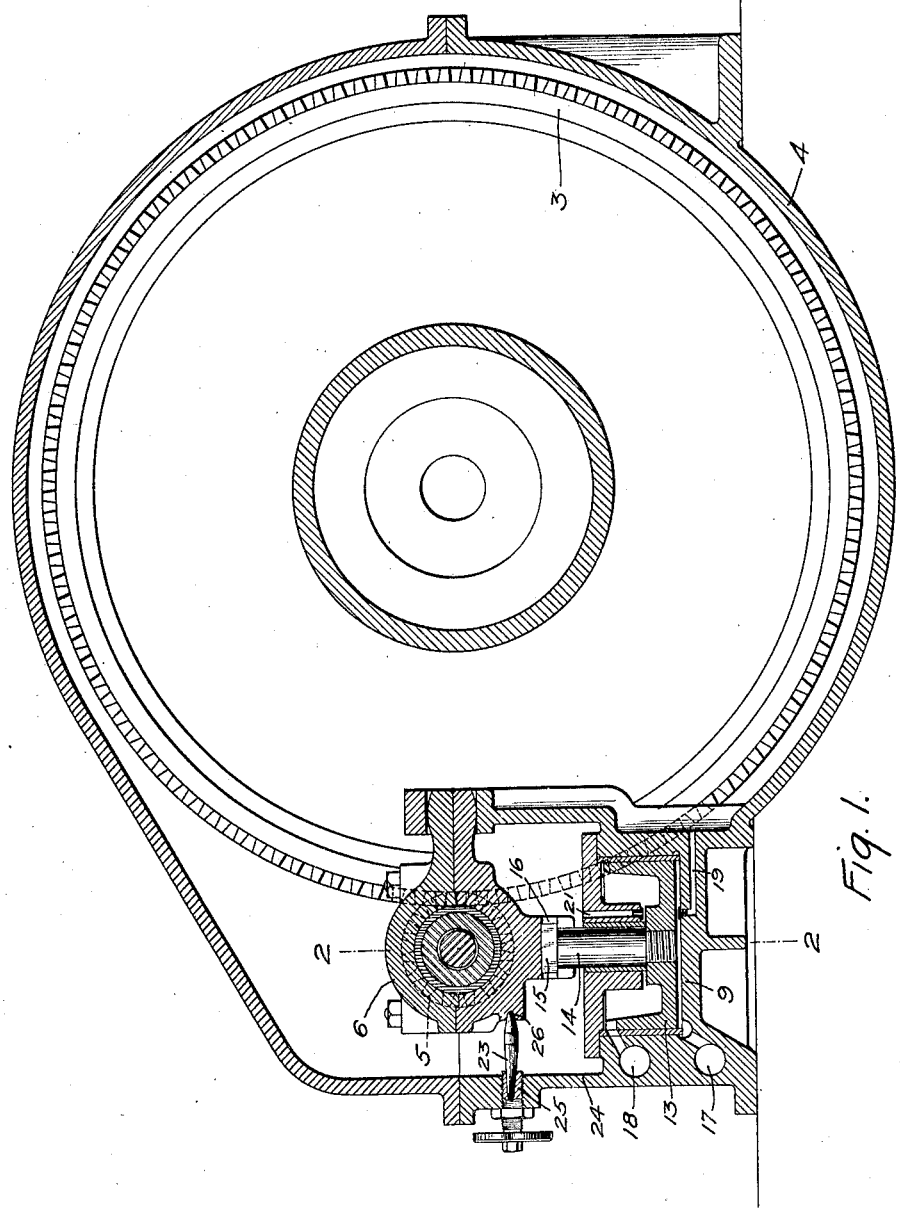

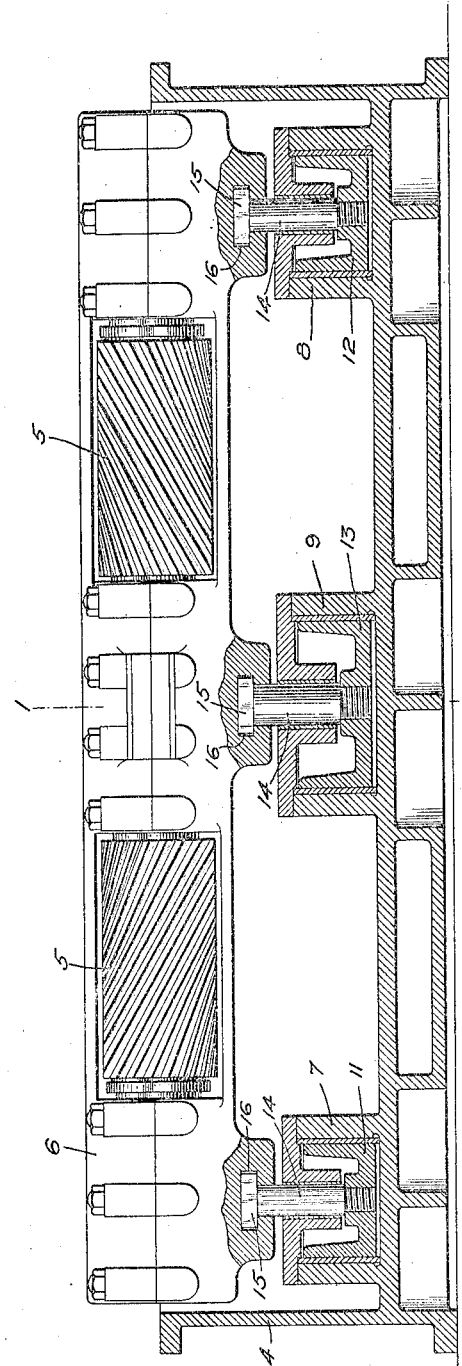

GEORGE WESTINGHOUSE, OF PITTSBURGH, PENNSYLVANIA, ASSIGNOR TO THE WESTINGHOUSE GEAR AND DYNAMOMETER COMPANY, A CORPORATION OF PENNSYLVANIA.

TRANSMISSION-GEARING.

1,088,387.  Specification of Letters Patent.  Patented Feb. 24, 1914.

Application filed June 18, 1910, Serial No. 567,615. Renewed July 23, 1913. Serial No. 780,813.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Transmission-Gearing, of which the following is a specification.

This invention relates to reduction gearing for transmitting power from high speed engines or motors to apparatus operating at lower speeds.

An object of this invention is to produce a reduction gearing in which means are employed for distributing and equalizing the pressure on the teeth of the different intermeshing gears employed.

A further object is to produce a reduction gearing in which simple means are employed for counterbalancing, by fluid pressure, the strains in either direction due to the tooth pressure between the intermeshing gears and in which simple means are employed for permitting relative angular motion between the intermeshing gears of the gearing.

Turbines operate most efficiently at relatively high speeds and ships' propellers operate most efficiently at relatively low speeds, consequently, in order to obtain the best efficiency when turbines are employed in marine propulsion, it is necessary to employ a reduction gearing between the turbine and the propeller. To this end, I have provided a driving member which may be connected to the turbine shaft and from which power may be delivered by the turbine to a more slowly revolving shaft by means of a pinion or pair of pinions which may be journaled in a floating frame and which intermesh with a gear wheel or a pair of gear wheels. The floating frame is supported on the base frame or bed of the gearing device so that it is free to assume different positions both in a horizontal or a vertical plane for the purpose of adjusting the position of the pinion shaft relative to the shaft of the gears and of thereby equalizing and equally distributing the tooth pressure along the teeth and between the different sets of intermeshing gears of the reduction gearing.

For the purpose of illustration, I have shown the device as consisting of a spur gearing including a gear and an intermeshing pinion in which the pinion is journaled in a fluid supported floating frame which permits the pinion to assume different angular positions relative to the gear in response to variations of tooth pressure encountered, whereby the pressures are proportionately distributed.

In the apparatus illustrated as an embodiment of my invention, the pinion is shown as having two sets of oppositely disposed spiral teeth and the gear likewise has two corresponding sets of spiral teeth. The floating frame of the pinion is supported on fluid actuated pistons so arranged that the fluid pressure employed to counterbalance the tooth pressure between the intermeshing gears will be automatically controlled so that it varies with variations in the tooth pressure.

Further advantages, as well as novelty of construction, will be specifically described hereinafter, it being understood that changes in form, proportion and minor details of construction may be resorted to without departing from the spirit of my invention or sacrificing any of its advantages.

In the drawings accompanying this application and forming a part thereto, Figure 1 is a sectional view along the line 1—1 of Fig. 2 and shows the position of the fluid actuated supports, a pinion, a gear with which it meshes and a strut for holding the pinion and gear in proper mesh; and Fig. 2 is a cross sectional view on the line 2—2 of Fig. 1.

Referring to the drawings: The gear 3 is journaled in a base frame or bed 4 of any suitable form and meshes with a suitable pinion 5 journaled in a suitable floating frame 6. The base frame 4 is provided with a number of cylinders in which fluid actuated supporting pistons for the floating frame 6 are mounted.

In the apparatus illustrated, three cylinders, 7, 8, and 9 are employed and pistons 11, 12, and 13 are respectively mounted in the cylinders. The pistons 11 and 12 are termed the end supporting pistons and the piston 13 is termed the intermediate supporting piston of the series.

Each cylinder is double acting and each piston is provided with piston rod or pin 14 which is rigidly secured to it and which extends through a suitable packing gland or bushing in the cylinder head of its respective cylinder. Each pin 14 is provided with a flat circular or preferably an oval head 15 which fits snugly into an under-cut slot or way 16 provided in the floating frame. The ways 16 extend across the floating frame and are so arranged that each pin can be slid into place in its respective slot before the frame 6 is in place, and the heads 15 will be securely held in place after the frame 6 is located in place.

The cylinders are adapted to be supplied with suitable fluid, for example oil, through passages 17 and 18 provided in the walls of the bed frame 4. The passage 17 delivers oil, through suitable connected passages, to the cylinders above their respective passages. The connecting passages are of ample area so that the oil pressure in all the cylinders below their respective pistons will be equalized through the passage 17 and will be the same as the pressure in that passage, and so that the oil pressure in all the cylinders above their respective pistons will be equalized by the passage 18 and be the same as the pressure in the passage 18. The intermediate cylinder 9 is provided with exhaust or discharge ports 19 and 21 which connects respectively with the cylinders below and above the piston 13. The inner end of each of these ports is so located that the piston 13 is capable of controlling the discharge of oil through them.

Oil is pumped continuously into the respective passages 17 and 18 through restricted orifices (not shown) and thence into the cylinders where it performs the function, through the agency of the pistons, of supporting the floating frame. The purpose of providing the ports 19 and 21 in the cylinder 9 is that the hydraulic pressure in the cylinders may be automatically varied in response to variations of tooth pressure between the intermeshing gears and pinions and so that the pistons 11, 12 and 13 will operate to exactly counterbalance the tooth pressures no matter in which direction the resulting strains may exist or how they may vary.

When the pinion 5 is driven in a counter clockwise direction (Fig. 1) so as to drive the gear 3 in a clockwise direction, the tooth pressure between the intermeshing teeth will tend to force the pistons 11, 12, and 13 down and to decrease the flow of oil through the port 19. As the piston 13 moves down in response to this pressure, the flow of oil through the port 19 is decreased by it, and this causes the oil pressure in the cylinder 9, below the piston 13, to pile up, the pressure in all the cylinders consequently increases until it is sufficient to counterbalance the tooth pressure. If, while the pinion 5 is operating as described, the tooth pressure decreases the upward pressure of the pistons will preponderate for an instant and the pistons will rise in response to the preponderance, but in so doing, the piston 13 will increase the flow of oil through the port 19 and consequently cause a drop in pressure in the cylinders below the pistons. The pressure will continue to drop until the upward pressure on the pistons is reduced to such an extent that they again exactly counterbalance the downward resultant of the tooth pressure.

The end pistons are of the same area while, in the apparatus illustrated, the intermediate piston is about twice the area of either end piston since the greatest pressure resulting from the tooth pressure is encountered at this central point. The areas of the pistons and the oil pressures employed are so proportioned that the piston 13 can never be moved to either fully close the port 19 or the port 21, consequently, the tooth pressure will always be counterbalanced by hydraulic or fluid pressure.

When the driving agent of the pinion 5 is reversed and the pinion is driven in a clockwise direction (Fig. 1) the tooth pressure is reversed and is transmitted to the pistons by a pull transmitted through the pins 14 secured to the pistons. These conditions will tend to lift the pistons and, by moving the piston 13 into close proximity with the port 21 to restrict the flow of oil from the cylinder 9 through the port 21. As the piston 13 rises in response to the tooth pressure the flow of oil through the port 21 is gradually restricted until the pressure in the cylinders above their pistons is sufficient to counterbalance the pull on the pins 14 occasioned by the tooth pressure. The operation of the piston 13 relative to the port 21 is similar to its operation relative to the port 19 and the oil pressure in the cylinders above their pistons will vary in response to variations of tooth pressure while the gearing is operating in the reverse direction.

The double acting cylinders cushion and distribute the stresses set up in both directions by the tooth presure and it will be apparent that the floating frame will be held in place by the piston and that it will practically float upon a body of fluid so that the strains will be taken up by the fluid in the respective cylinders and that the pressure will be properly distributed between the different bodies of fluid. If for any reason the tooth pressure between the intermeshing teeth located at the right hand end of the reduction gearing (Fig. 2) would tend to exceed the tooth pressure between the intermeshing teeth at the other end of the gearing, the piston 12 would then tend to assume a greater load than the piston 11. Such conditions, however, are impossible with the hydraulic system employed and the end pistons instead of assuming different loads will adjust the load equally between them by adjusting their positions and consequently the position of the floating frame. By changing the position of the floating frame the position of the pinion 5 is varied and in this manner the pressure between the intermeshing teeth at each end of the gearing is equalized. The same result would be accomplished by this angular motion of the pinion if the gear teeth extended the entire length of the pinion, and the tooth pressures would then be equalized throughout the entire length of the teeth.

In order to prevent horizontal angular movement of the floating frame and still permit sufficient angular movement in a plane perpendicular to the plane of the axes of the pinion and gear, I have provided, as illustrated in Fig. 1, a strut of which there may be any suitable number, projecting through the wall 24 of the base frame 4. The strut may conveniently consist of a hollow threaded member 25 adapted to receive a bar or pin 23 which engages a suitably located slot 26 provided in a lateral face of the floating frame 6. The member 25 is threaded exteriorly to engage interior threads in the wall 24 of the base frame so that a micrometer adjustment may be made and the floating frame may be so adjusted with respect to the gear that a proper engagement of the teeth of the pinion and gear will be maintained, and, at the same time, vertical angular movement of the pinion relative to the plane of the axes of the pinion and gear will not be retarded.

Having thus described my invention, what I claim is:

1. In a transmission gearing, intermeshing gears, fluid actuated supports for said gears, and means for varying the operation of each of said supports to cause them to counterbalance the strains in either direction due to tooth pressure between the intermeshing gears.

2. In a transmission gearing, intermeshing gears, and double acting fluid actuated supporting means for one of the intermeshing gears constructed to allow relative motion between the intermeshing gears.

3. In a transmission gearing, intermeshing gears, and double acting fluid actuated pistons for supporting one of said intermeshing gears and constructed to allow relative motion between said gears.

4. In a transmission gearing, a gear, a pinion meshing therewith, and double acting fluid actuated supporting pistons constructed to allow relative motion between said gear and said pinion.

5. In a transmission gearing, a gear, a pinion, a fluid actuated supporting piston, and means for causing said piston to operate to counterbalance strains in either direction due to tooth pressure between said gear and pinion.

6. In a transmission gearing, intermeshing gears, double acting cylinders, support pistons located in said cylinders and arranged to allow relative angular motion between said gears, a source of fluid supply for said cylinders, and means responsive to variations in the tooth pressure between the intermeshing gears for varying the fluid pressure on said pistons.

7. In a transmission gearing, intermeshing gears, a floating frame for one of said gears, a double acting fluid pressure cylinder for supporting said frame and for counterbalancing strains due to tooth pressure between said gears, and means responsive to variations of said tooth pressure for controlling the fluid presure in said cylinder.

8. In a transmission gearing, a gear, a pinion intermeshing therewith, a floating frame for said pinion, a double acting fluid pressure cylinder, a piston operating in said cylinder for supporting said frame and for counterbalancing strains due to tooth pressure, and means controlled by said piston for varying the fluid pressure within said cylinder.

9. In a transmission gearing, a gear, a pinion meshing therewith, a floating frame for said pinion, fluid actuated pistons for supporting said frame, and means actuated by at least one of said pistons for causing the fluid in each of said cylinders to counterbalance strains on said frame in either direction.

10. In a transmission gearing, intermeshing gears, a system of communicating cylinders, support pistons operating in said cylinders and adapted to permit relative angular motion between said gears, a source of fluid supply communicating with said cylinders below said pistons, a source of fluid supply communicating with cylinders above said pistons, and means responsive to variations in tooth pressure between the intermeshing gears for varying the fluid pressure in said cylinders above and below said pistons.

11. In combination with a pair of coöperating gears, means for supporting one of said gears comprising a cylinder, a double-acting piston and fluid under pressure.

12. In combination with a pair of coöperating gears, a mounting frame for one of said gears and a support for said mounting frame comprising a cylinder, a double-acting piston and fluid under pressure.

13. In a transmission gearing, intermeshing gears, a frame on which one of said gears is mounted, means comprising pistons spaced apart for supporting said frame, a separate cylinder inclosing each piston, means for delivering fluid pressure to each end of each cylinder for controlling the operation of said pistons, and means controlled by the variations of tooth pressures between said gears for varying the amount and direction of the effective pressure transmitted by said pistons.

14. In a transmission gearing, intermeshing gears, a frame on which one of said gears is mounted, a plurality of pistons for supporting said frame, a separate cylinder inclosing each piston, means for delivering fluid pressure to each end of each cylinder, means for maintaining the pressures in the corresponding ends of the cylinders equal, and means for varying the pressure in said cylinders in response to variations in the tooth pressure between the gears.

15. In a transmission gearing, intermeshing gears, a frame on which one of said gears is mounted, a plurality of pistons for supporting said frame, a separate cylinder for each piston, means for delivering fluid of equal pressure to each cylinder on the frame sides of the pistons, means for delivering fluid of equal pressure to each cylinder on the opposite sides of the pistons, and means responsive to variations in tooth pressure for varying the amount and the direction of the effective pressure within said cylinders.

16. In a transmission gearing, intermeshing gears, a frame on which one of said gears is mounted, means comprising a plurality of double-acting pistons and coöperating cylinders for supporting said frame and for equalizing the tooth pressure along the teeth of said gears, and means responsive to variations in the position of the frame for varying the amount and the direction of the effective pressure of the pistons.

17. In a transmission gearing, intermeshing gears, means comprising a double-acting fluid actuated piston for supporting one of said gears so that it is movable at an angle to the other gear, and means for substantially limiting the angular motion of the movable gear to a single plane.

18. In a transmission gearing, intermeshing gears, a single fluid actuated device for supporting one of said gears so as to equalize the tooth pressure along the teeth of the gears, and means responsive to variations in the tooth pressure between said gears for varying the actuating pressure of the device to vary the amount and direction of the supporting pressure exerted by the device.

19. In a transmission gearing, intermeshing gears, means comprising a plurality of double-acting fluid actuated pistons for supporting one of said gears and for equalizing the tooth pressure along the teeth of the gears, and means responsive to variations in the tooth pressure between the gears for varying the amount and the direction of the effective pressure exerted by the pistons on said supporting gear.

In testimony whereof, I have hereunto subscribed my name this 15th day of June, 1910.

GEO. WESTINGHOUSE.

Witnesses:
C. W. McGHEE,
E. W. McCALLISTER.

Copies of this patent may be obtained for five cents each, by addressing the "Commissioner of Patents, Washington, D. C."